US008888073B2

(12) United States Patent  (10) Patent No.: US 8,888,073 B2
Leung et al.  (45) Date of Patent: Nov. 18, 2014

(54) CARBONATED BEVERAGE APPLIANCE

(75) Inventors: Anthony Kit Lun Leung, North Point (HK); Joseph W. Zakowski, New Canaan, CT (US)

(73) Assignee: Conair Corporation, Stamford, CT (US)

( * ) Notice: Subject to any disclaimer, the term of this patent is extended or adjusted under 35 U.S.C. 154(b) by 270 days.

(21) Appl. No.: 13/368,774

(22) Filed: Feb. 8, 2012

(65) Prior Publication Data

US 2013/0089645 A1  Apr. 11, 2013

Related U.S. Application Data

(60) Provisional application No. 61/545,748, filed on Oct. 11, 2011.

(51) Int. Cl.
A47J 31/46 (2006.01)
A23L 2/54 (2006.01)

(52) U.S. Cl.
CPC ............. *A23L 2/54* (2013.01); *B01F 23/04794* (2013.01)
USPC .................. 261/75; 261/38; 261/54; 261/64.1

(58) Field of Classification Search
USPC ......................... 261/75, 38, 54, 64.1; 426/477
See application file for complete search history.

(56) References Cited

U.S. PATENT DOCUMENTS

| 4,082,123 A | * | 4/1978 | Haythornthwaite et al. ... 141/64 |
| 4,481,986 A | * | 11/1984 | Meyers .............................. 141/4 |
| 4,610,282 A | * | 9/1986 | Brooks et al. ................... 141/46 |
| 4,712,713 A | * | 12/1987 | Karlis et al. ....................... 222/3 |
| 5,044,171 A | * | 9/1991 | Farkas ............................ 62/306 |
| 5,139,179 A | * | 8/1992 | Cecil ............................. 222/399 |
| 7,337,924 B2 | * | 3/2008 | Crisp et al. ................. 222/129.1 |
| 2005/0098225 A1 | * | 5/2005 | Chantalat ........................ 141/64 |
| 2007/0257380 A1 | * | 11/2007 | Thomson et al. ............ 261/64.5 |
| 2013/0037969 A1 | * | 2/2013 | Ring et al. ....................... 261/63 |

\* cited by examiner

*Primary Examiner* — Anthony Weier
(74) *Attorney, Agent, or Firm* — McCormick Paulding & Huber LLP

(57) ABSTRACT

A carbonated beverage appliance in accordance with the present invention includes a housing and a carbonating head assembly configured to releasably engage a top end of a bottle containing a liquid to be carbonated. The bottle is engaged with the head assembly in a manner so as to provide a liquid and gas-tight seal. A tube is arranged in the housing for directing a flow of pressurized gas from a gas cylinder to the liquid within the bottle to produce a carbonated beverage. The carbonated beverage appliance includes a quick-connect mechanism for attaching a gas cylinder to the appliance, and a dispensing mechanism for the on-demand dispensing of a carbonated beverage from the bottle while it is attached to the appliance.

11 Claims, 13 Drawing Sheets

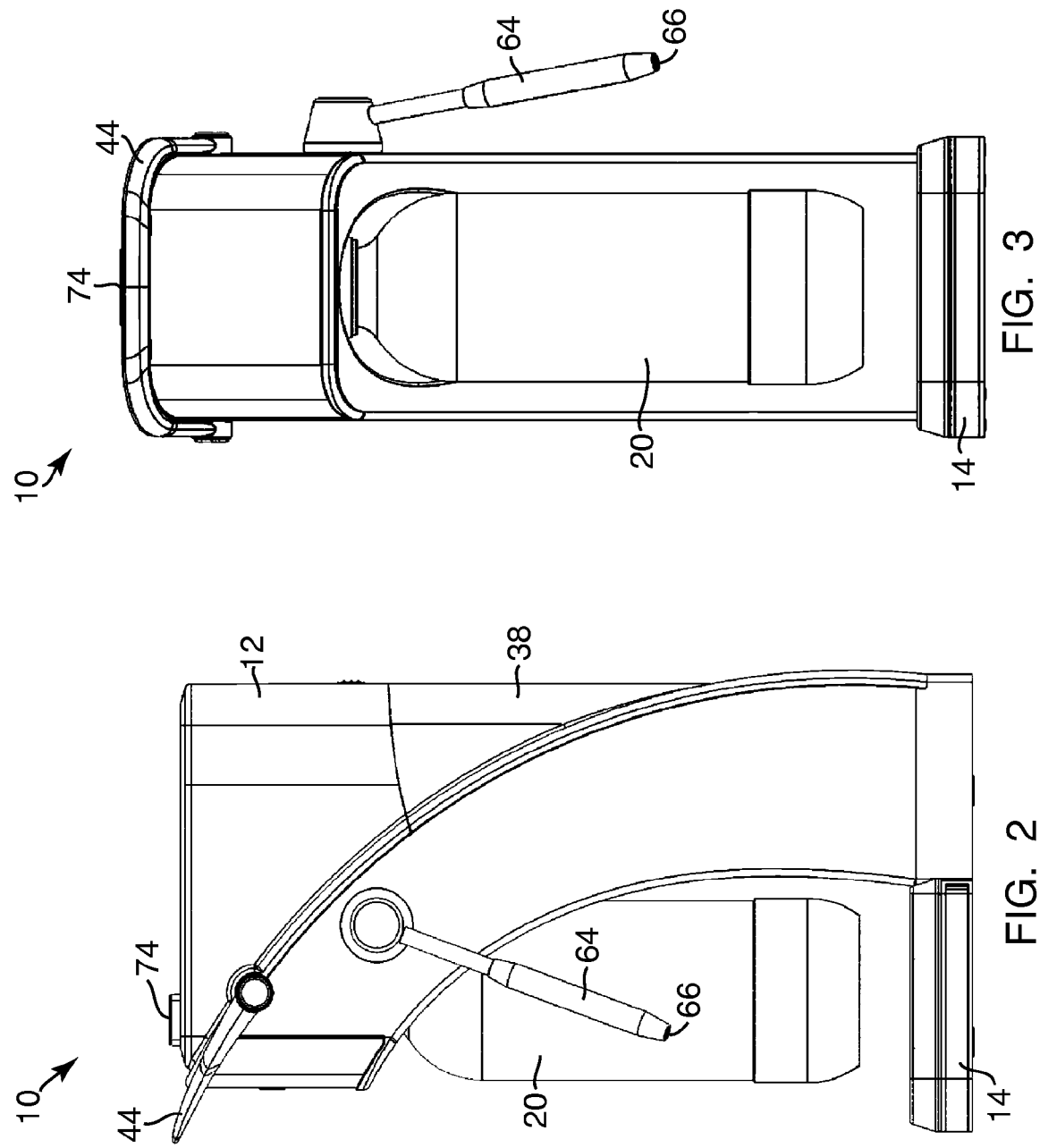

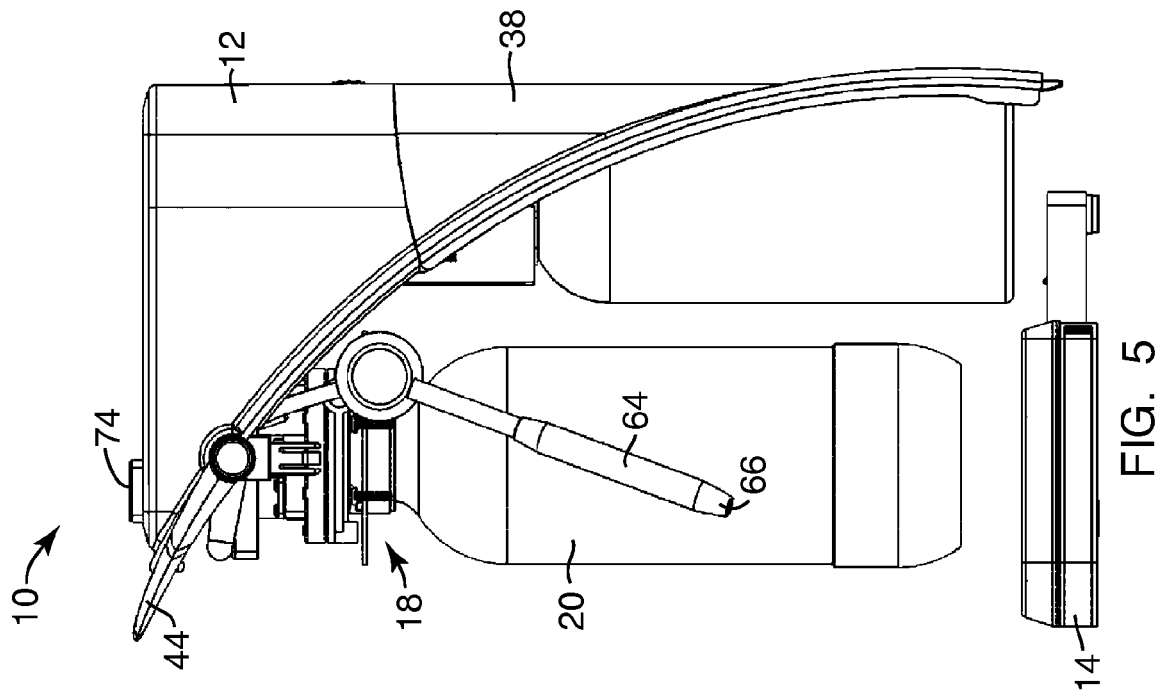
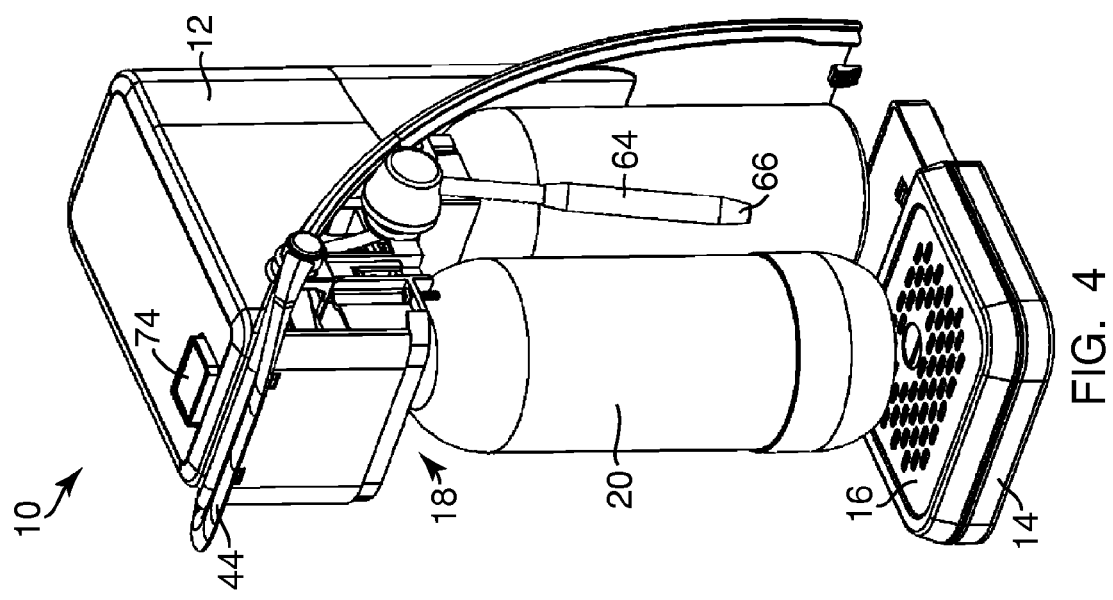

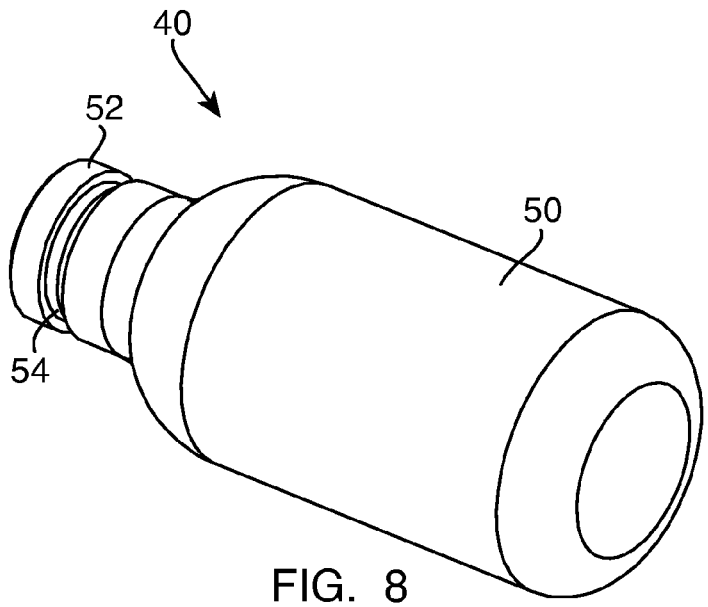
FIG. 8
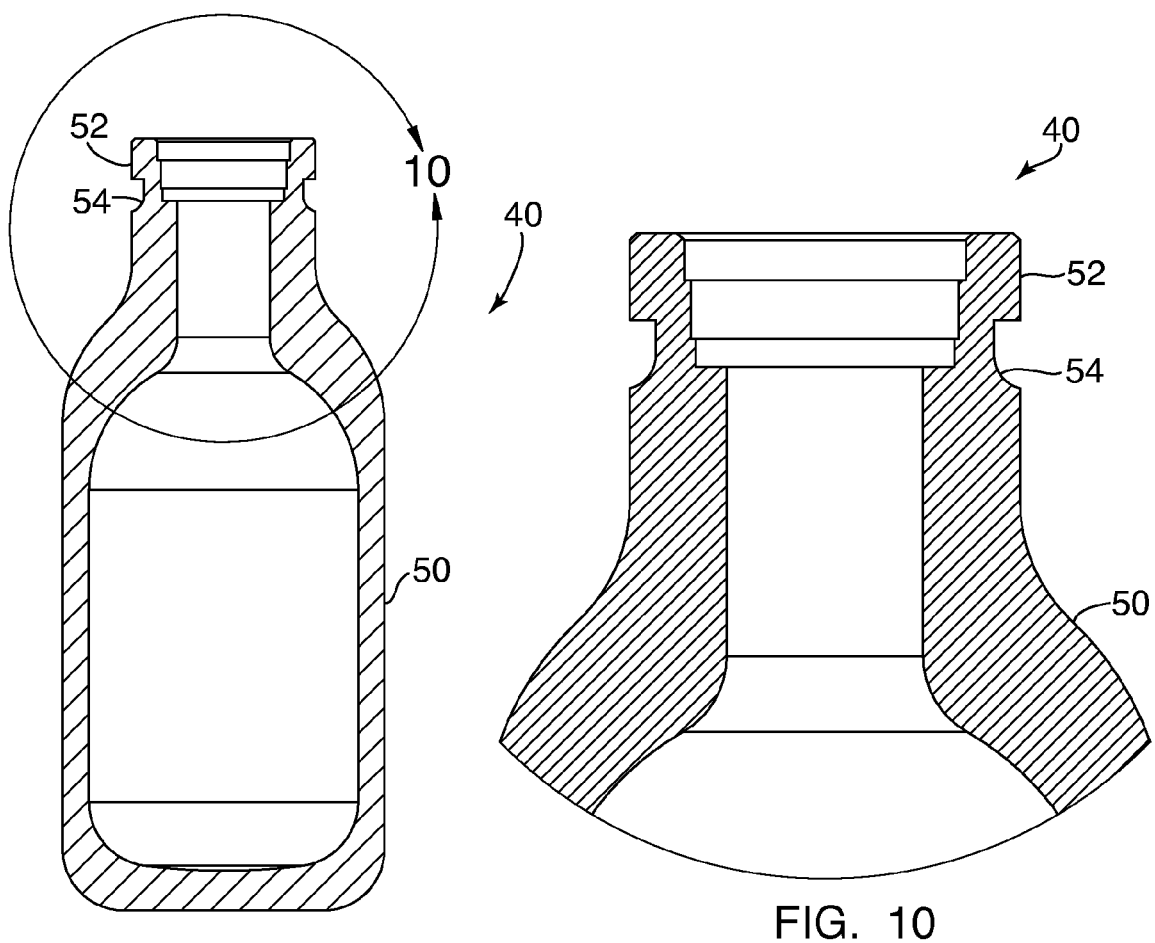
FIG. 9
FIG. 10

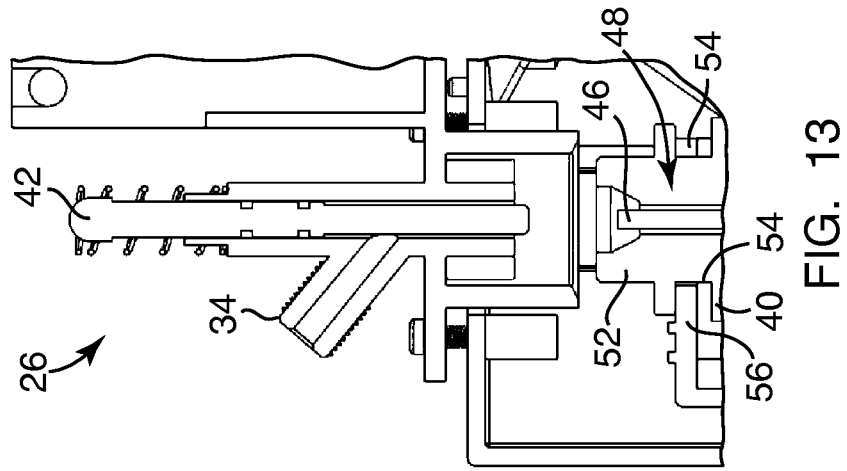
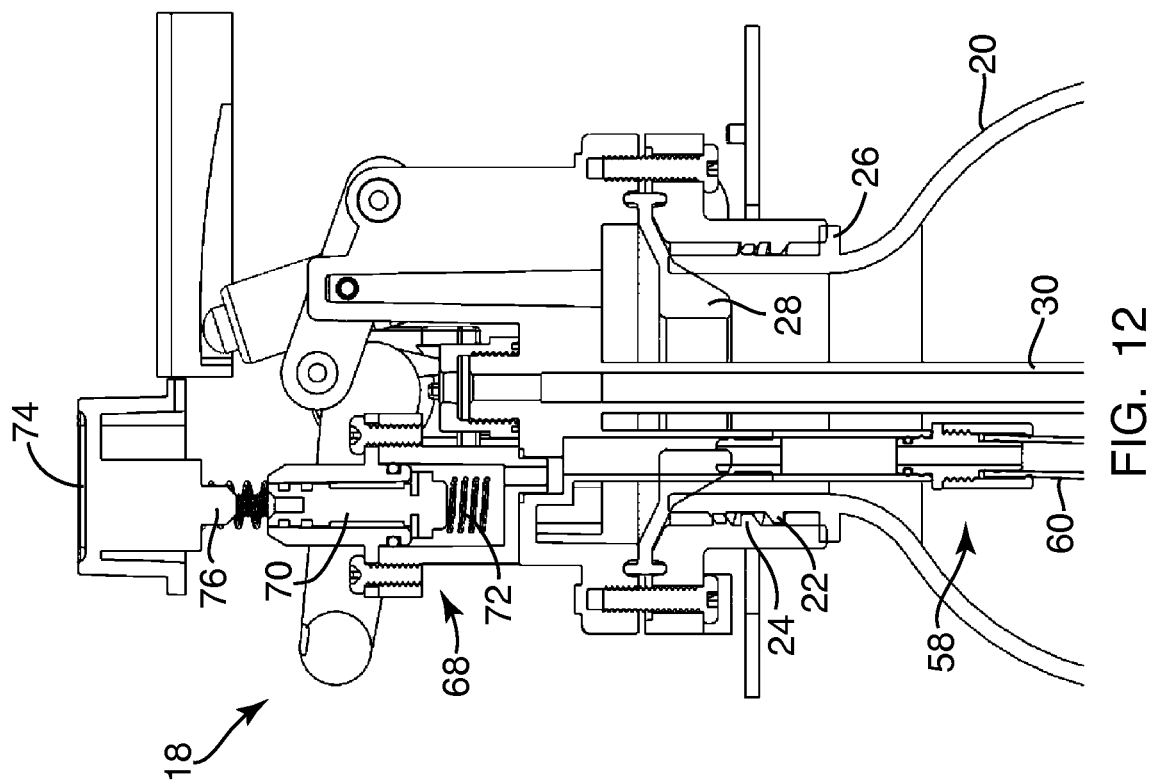

CARBONATED BEVERAGE APPLIANCE

CROSS-REFERENCE TO RELATED APPLICATIONS

This application claims the benefit of U.S. Provisional Application Ser. No. 61/545,748, filed on Oct. 11, 2011, which is incorporated by reference herein in its entirety.

FIELD OF THE INVENTION

The present invention relates generally to devices for aerating liquids and, more particularly, to an apparatus for making carbonated beverages.

BACKGROUND OF THE INVENTION

Various devices exist for carbonating liquids to prepared carbonated beverages. With known devices, the liquid to be carbonated is placed into a bottle and the bottle is loaded into a carbonating machine. A seal member is adapted to engage and seal closed the neck of the bottle, while a tube terminating in a gas injecting nozzle extends through the seal member and down into the bottle for injecting carbon dioxide gas into the liquid contained in the bottle. The upper end of the gas tube is connected to a fixed or removable gas cylinder via a valve which is operable to supply gas to the injection nozzle. In order to limit the maximum pressure within the bottle an exhaust passage is provided through the seal member and communicates with atmosphere through a relief valve which is configured to open when the maximum pressure is exceeded.

While existing devices are generally suitable for what is regarded as ordinary performance, there is room for improvement in terms of flexibility, ease of use and the like. In particular, known devices may only be utilized to produce a carbonated beverage within the bottle, which is then capped, for later consumption. Moreover, existing devices are often cumbersome to configure and operate, especially when replacing the carbon dioxide gas cylinder.

SUMMARY OF THE INVENTION

It is an object of the present invention to provide a carbonated beverage-making appliance having an on-demand beverage-dispensing feature.

It is another object of the present invention to provide a carbonated beverage-making appliance having a gas cylinder attachment mechanism that permits quick, easy and secure attachment of a pressurized gas cylinder.

These and other objects are achieved by the present invention.

A carbonated beverage appliance in accordance with the present invention includes a housing and a carbonating head assembly configured to releasably engage a top end of a bottle containing a liquid to be carbonated. The bottle is engaged with the head assembly in a manner so as to provide a liquid and gas-tight seal. A tube is arranged in the housing for directing a flow of pressurized gas from a gas cylinder to the liquid within the bottle to produce a carbonated beverage. The carbonated beverage appliance includes a quick-connect mechanism for attaching a gas cylinder to the appliance, and a dispensing mechanism for the on-demand dispensing of a carbonated beverage from the bottle while it is attached to the appliance.

BRIEF DESCRIPTION OF THE DRAWINGS

The present invention will be better understood from reading the following description of non-limiting embodiments, with reference to the attached drawings, wherein below:

FIG. 2 is a right side elevational view of the carbonated beverage appliance of FIG. 1.

FIG. 3 is a front elevational view of the carbonated beverage appliance of FIG. 1.

FIG. 4 is a front, right side perspective view of the carbonated beverage appliance of FIG. 1 with a portion of the exterior housing removed.

FIG. 5 is a right side elevational view of the carbonated beverage appliance of FIG. 1 with a portion of the exterior housing removed.

FIG. 8 is a perspective view of a gas cylinder according to an embodiment of the present invention, for use with the carbonated beverage appliance of FIG. 1.

FIG. 9 is a cross-sectional side view of the gas cylinder of FIG. 8.

FIG. 10 is an enlarged cross-sectional side view of the gas cylinder of FIG. 8.

FIG. 12 is an enlarged, cross-sectional view of a bottle/carbonating head connection of the carbonated beverage appliance of FIG. 1.

FIG. 13 is an enlarged, cross-sectional view of a gas cylinder quick-connect mechanism of the carbonated beverage appliance of FIG. 1.

DETAILED DESCRIPTION OF THE PREFERRED EMBODIMENT

Figure 1:
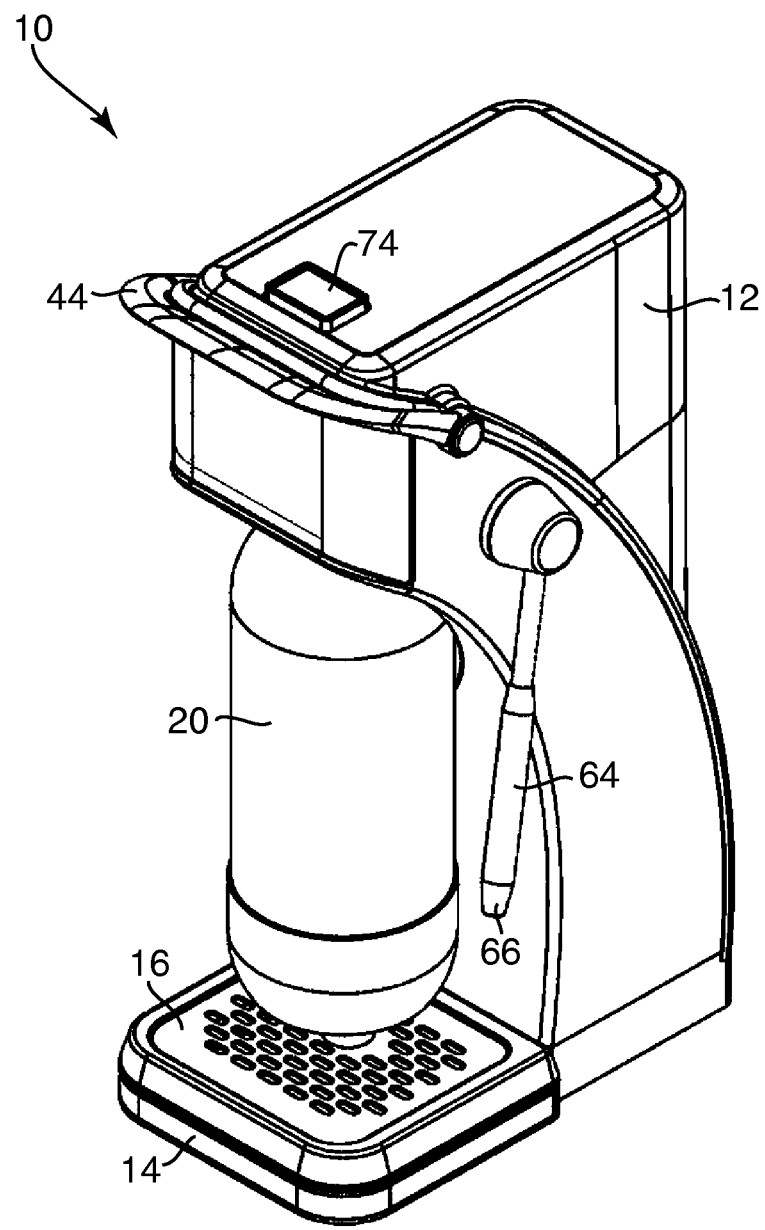
FIG. 1 is a perspective view of a carbonated beverage appliance according to an embodiment of the present invention.
Figure 6:
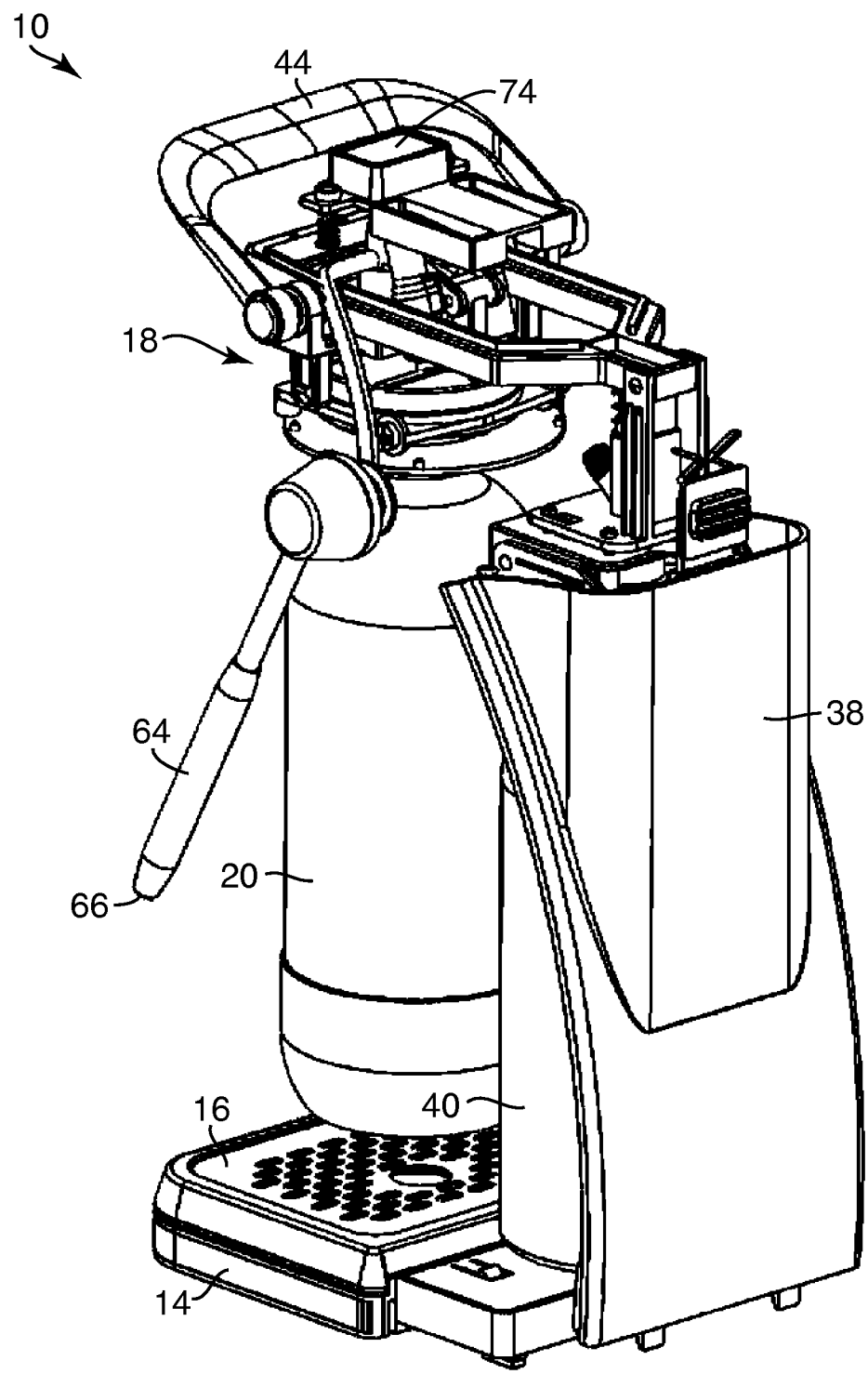
FIG. 6 is a rear, right side perspective view of the carbonated beverage appliance of FIG. 1 with a portion of the exterior housing removed.
Figure 7:
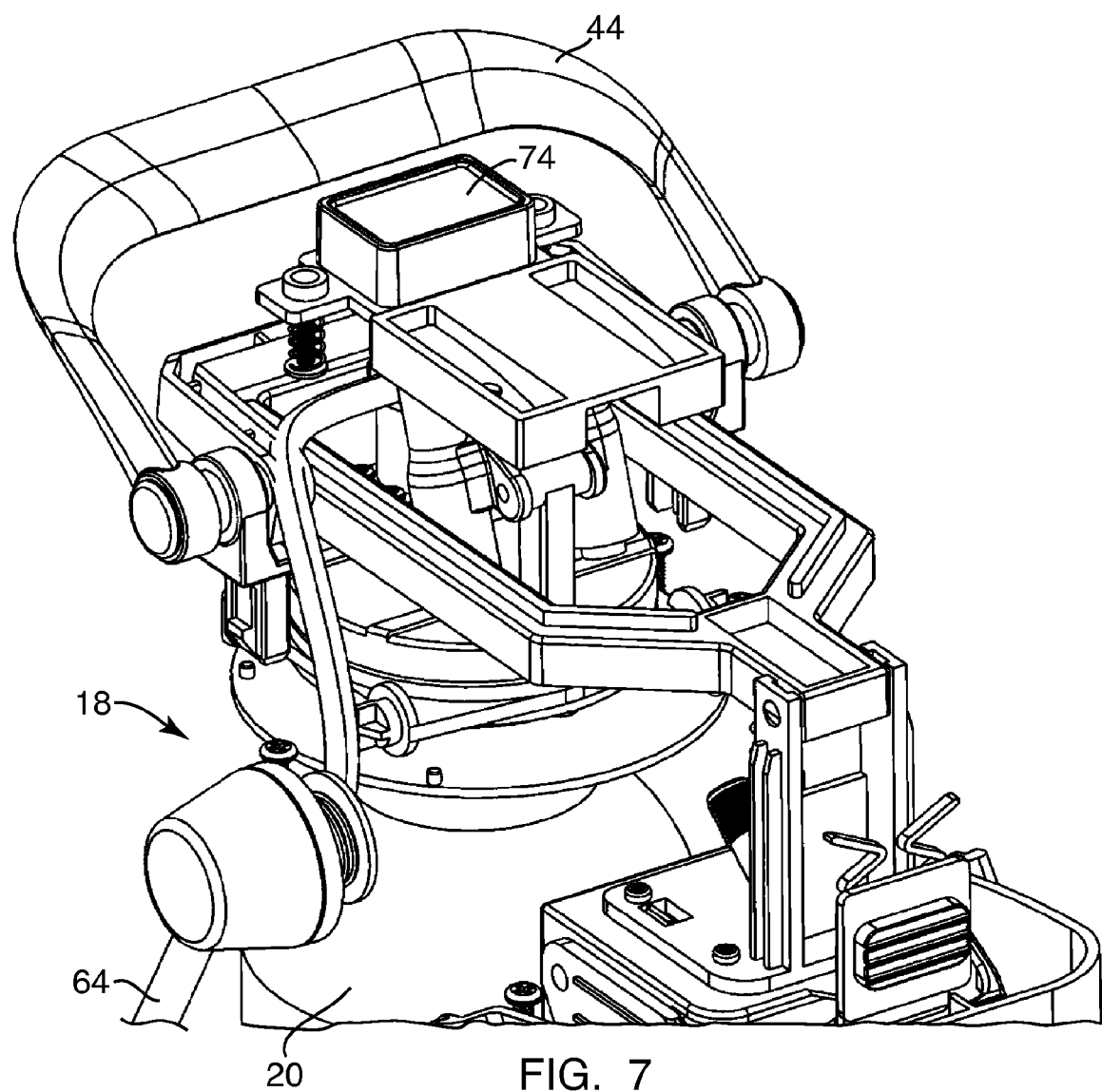
FIG. 7 is an enlarged rear, right side perspective view of the interior components of the carbonated beverage appliance of FIG. 1.

With reference to the drawings, a carbonated beverage appliance 10 according to an embodiment of the present invention is generally constructed and operates in a manner similar to existing carbonated beverage making appliances, such as those disclosed in U.S. Pat. Nos. 5,209,378, 4,610, 282 and 4,399,081, which are hereby incorporated by reference in their entireties. As shown in FIGS. 1-3, the carbonated beverage appliance 10 includes a generally rectangular housing 12 and a drip tray base 14 removably attached to the housing 12. The drip tray 14 has a slotted or grated top surface 16 that permits liquid that may be spilled to pass through the surface 16 and collect in the drip tray 14 for easy cleanup. As shown in FIGS. 4 and 5, the appliance 10 further includes a bottle-receiving mechanism, shown as a carbonating head assembly 18. The carbonating head assembly 18 is accessible from an underside of a top portion of the housing 12 and is configured to releasably receive a bottle 20. As shown therein, the carbonating head assembly 18 is located directly above the drip tray 14.

Figure 14:
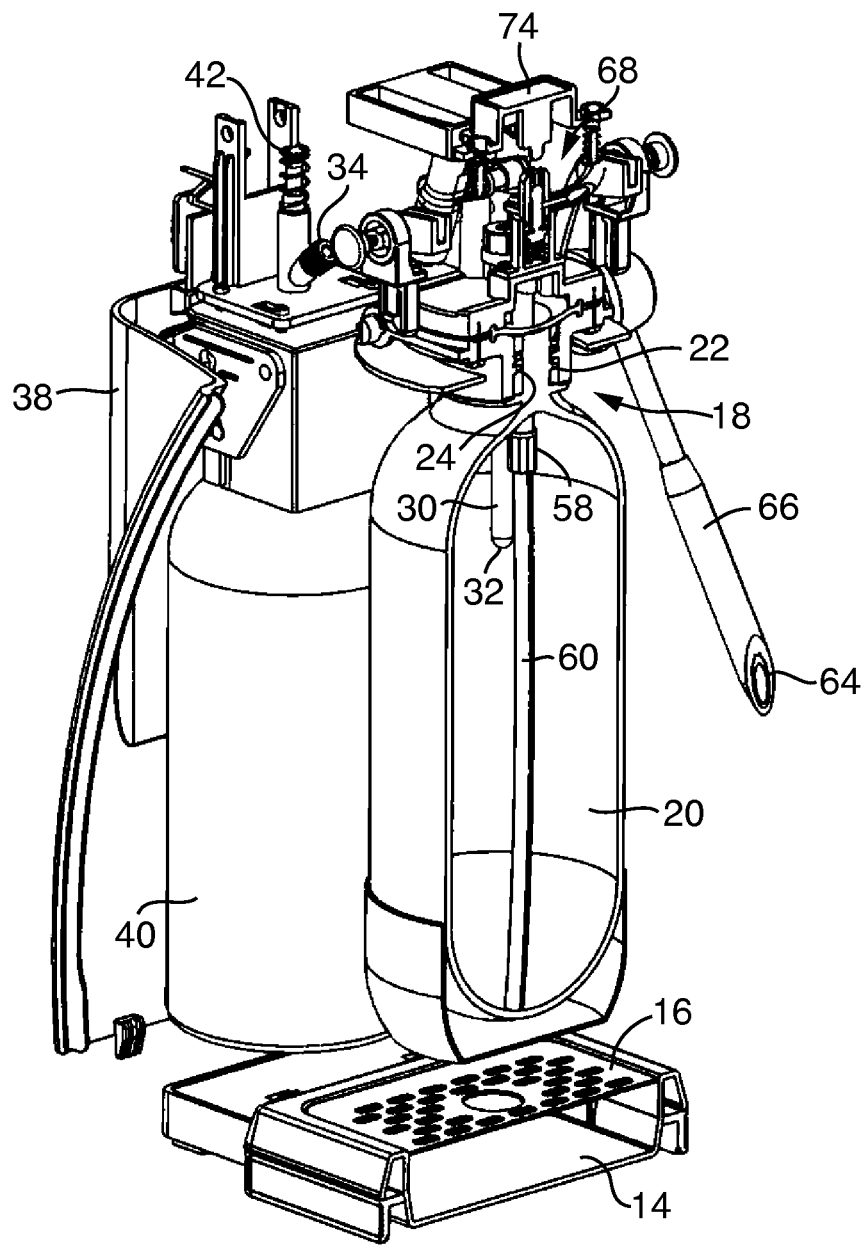
FIG. 14 is a front, left side perspective view of the carbonated beverage appliance of FIG. 1 with the exterior housing removed and some components shown in cross-section.
Figure 15:
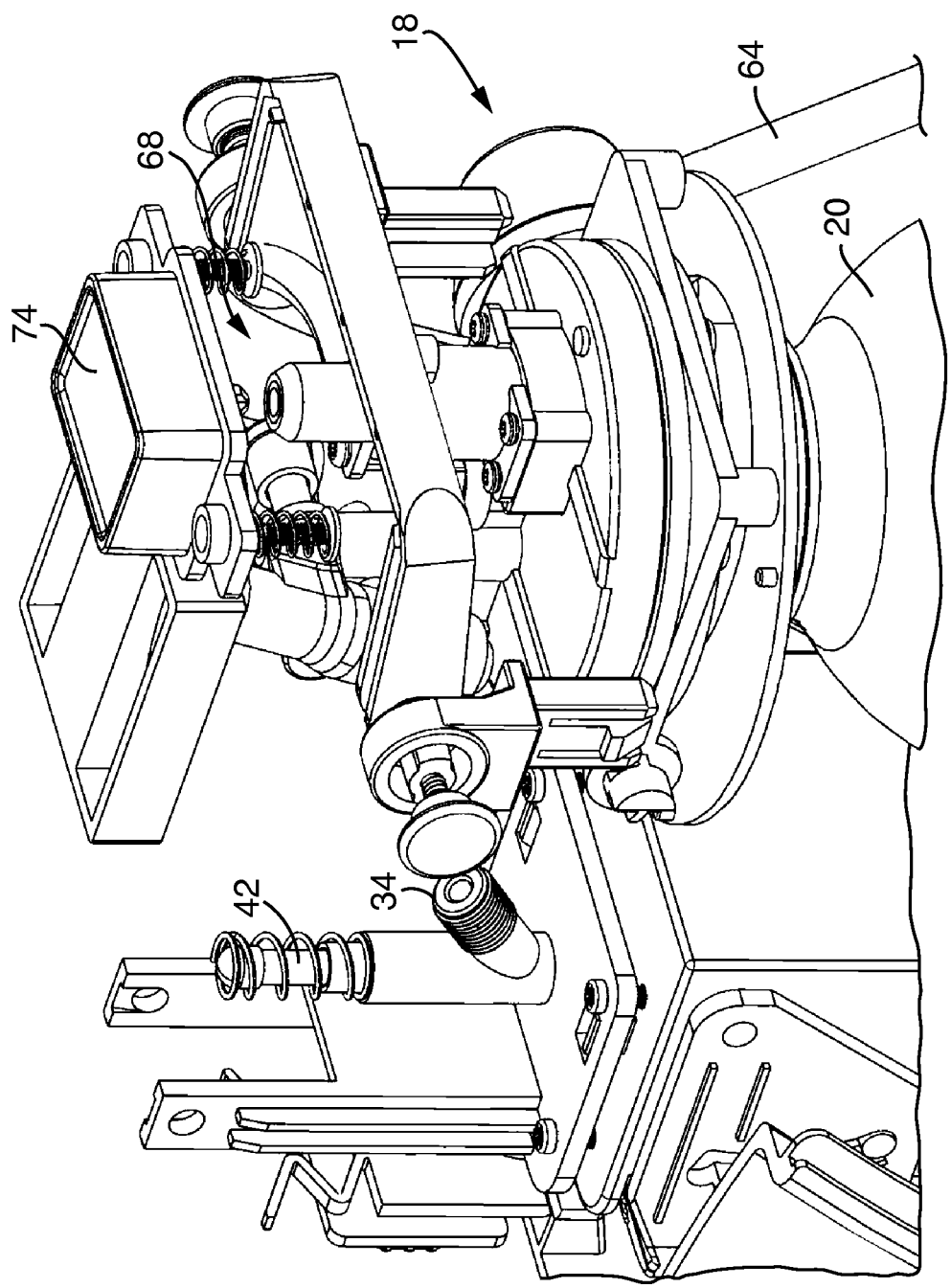
FIG. 15 is an enlarged front, left side perspective view of the interior components of the carbonated beverage appliance of FIG. 1.

The bottle 20, containing liquid to be carbonated or aerated, is releasably engageable with the carbonating head assembly 18 and is held in engagement with the head assembly 18 by means of an external thread 22 provided on the bottle 20 which engages an internal thread 24 provided in the head assembly 18, although other engagement means known in the art may also be utilized without departing from the broader aspects of the present invention. The threaded engagement of the bottle 20 with the carbonating head assembly 18 is best shown in FIGS. 12 and 14. To install or remove a bottle 20 from the appliance 10, a user simply rotates the bottle 20 with respect to the head assembly 18.

As further shown in FIG. 12, the neck of the bottle 20 may include a flange 26 for limiting the distance by which the bottle screws into the carbonating head assembly 18. When fully screwed in or engaged by the head assembly 18, the open top end of the bottle contacts an elastomeric gasket 28, preferably made of rubber or other similar material, with sufficient pressure to create a gas and fluid tight seal. As will be readily appreciated, a gas and fluid tight seal is necessary to pressurize the bottle, as discussed hereinafter.

The carbonating head assembly 18 accommodates a carbonating tube 30 which extends through the gasket 28, against which the top end of the bottle 20 is engaged, and down into the bottle 20. At its lower end, the tube 30 is provided with a nozzle 32. The upper end of the tube 30 is threaded into an upper part of the carbonating head 18, which is in fluid communication with a bore 34 of a gas cylinder attachment head 36.

As shown in the drawings, the gas cylinder attachment head 36 is accessible from the rear of the housing by removing a gas cylinder compartment cover 38 that forms a part of the housing 12. As shown in FIG. 13, and as discussed in detail hereinafter, the gas cylinder attachment head 36 and provides a quick-connect mechanism for attaching and detaching a gas cylinder 40 to the appliance 10. In particular, as shown therein, a gas cylinder 40 containing pressurized gas, such as $CO_2$, is releasably engaged with the cylinder attachment head 36 such that an outlet of the cylinder 40 is in fluid communication with the bore 34 of the cylinder attachment head 36 and, in turn, with the nozzle 32 of the carbonating tube 30 such that a pressurized gas flow pathway is created from the gas cylinder 40 to the interior of the bottle 20. The cylinder attachment head 36 includes a spring-biased plunger 42 operatively connected to a gas valve-actuating lever 44. In operation, actuation of the lever 44 causes the plunger 42 to move downwards into contact with a pin 46 of a gas valve assembly 48 positioned in the neck of the gas cylinder 40. Further downwards movement of the plunger 42 moves the pin 46 downwards, thereby opening the gas valve and causing pressurized gas to be released from the gas cylinder 40.

The gas-valve actuating lever 44 is movable from a raised position, in which the valve assembly is not actuated, to a lowered position, in which the valve assembly is actuated to release pressurized gas from the cylinder 40, in a manner known in the art. In particular, lowering of the lever 44 permits gas to pass from the cylinder 40 through the bore 34 of the cylinder attachment head 36, through the tube 30, and into the bottle 20 containing the liquid to be carbonated. The lever may 44 be biased towards its raised position so that when a user releases the lever the gas valve assembly 48 is automatically closed to stem the flow of gas from the cylinder 40. In an embodiment, the valve assembly may be provided with a safety device, such as a pressure relief valve, to release excess pressure in the gas cylinder 40.

Figure 16:
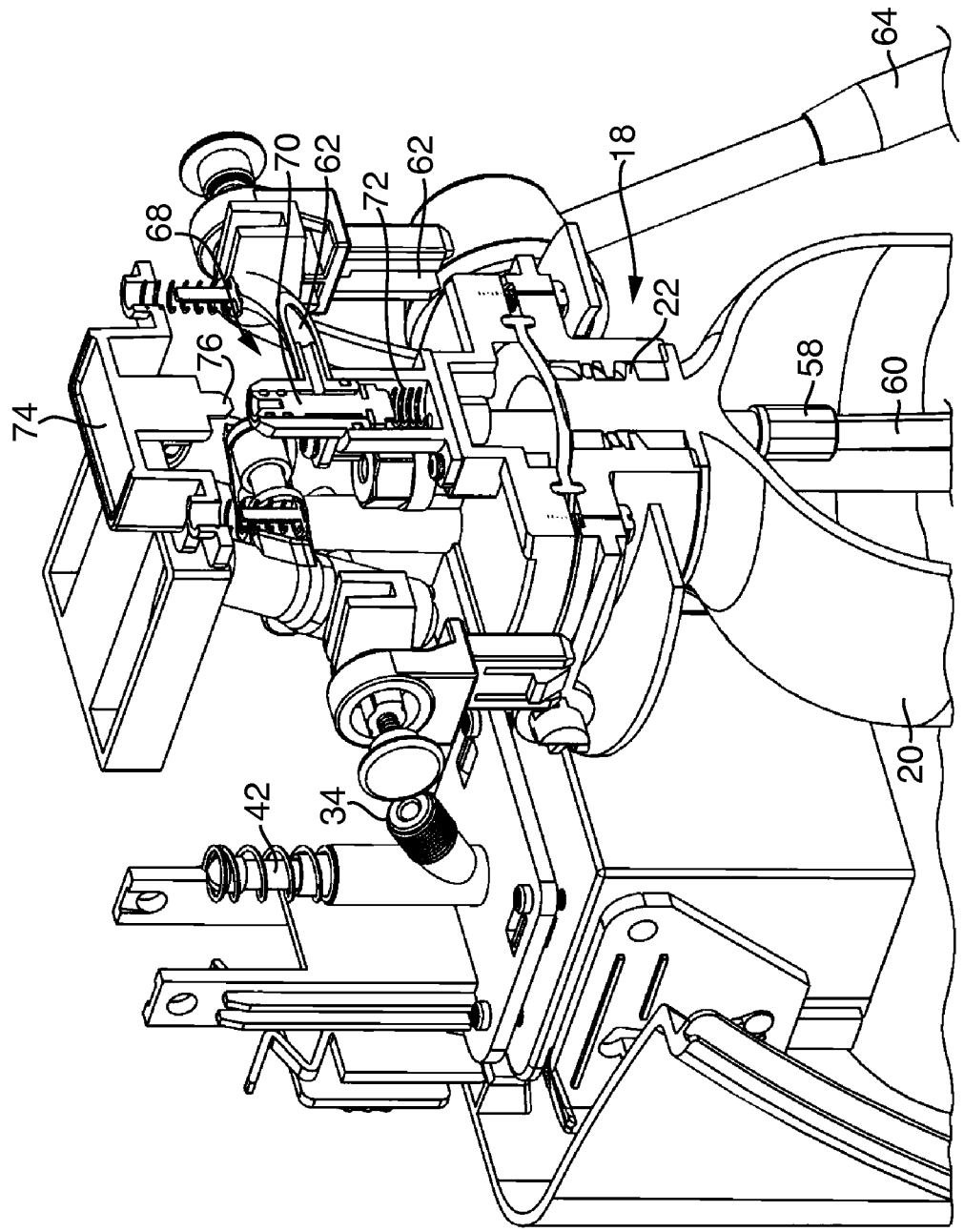
FIG. 16 is an enlarged front, left side perspective view of the interior components of the carbonated beverage appliance of FIG. 1, some of which are shown in cross-section.

The gas cylinder attachment head 36 and the gas cylinder 40 are important aspects of the present invention. As shown in FIGS. 8-10, the gas cylinder 40 for use with the appliance 10 is generally cylindrical in shape and includes a main body portion 50 and a neck portion 52. The neck portion 52 includes a circumferential groove 54 formed in the outer periphery thereof. As best shown in FIGS. 9 and 10, the interior of the neck 52 is configured to receive the gas valve 48 assembly, including pin 46. The circumferential groove 48 formed in the neck 46 of the cylinder 40 is configured to be received by a complimentary flange 56 of the gas cylinder attachment head 36, as shown in FIG. 16. As will be readily appreciated, a user may simply push the gas cylinder 40 into engagement within the attachment head 36 to secure it to the appliance 10. After the cylinder 40 is empty, a user may simply pull on the cylinder 40 to remove it from the appliance 10. As will be readily appreciated, the non-threaded engagement means of the gas cylinder attachment head 36 provides a quick-connect mechanism. Importantly, this quick-connect design of the attachment head 36 and gas cylinder 40 allows a user to quickly and easily connect and disconnect a $CO_2$ cylinder 40 from the appliance 10. This is in contrast to existing devices that utilize threaded-neck gas cylinders. With existing appliances utilizing threaded cylinders, a user must rotate the cylinder to secure it to the appliance, which may be tedious and time consuming.

Figure 11:
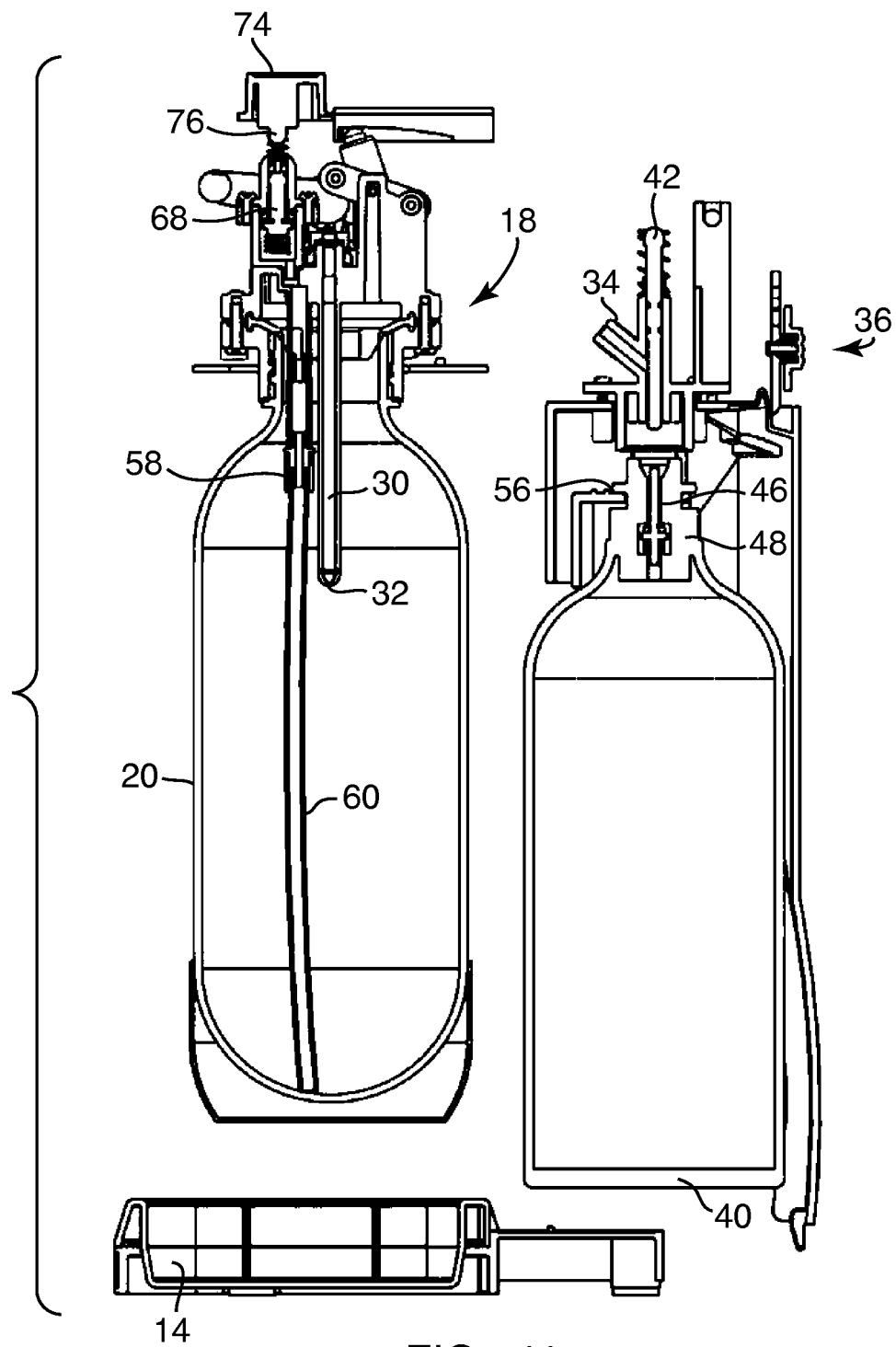
FIG. 11 is a right side, cross-sectional view of the carbonated beverage appliance of FIG. 1 with the exterior housing removed and some components shown in cross-section.

As generally discussed above, the plunger 42 is movable from the position shown in FIGS. 11 and 13 into contact with the pin 46 of the gas valve assembly 48 upon downwards movement of the valve-actuating lever 44. During operation of the lever 44, the plunger 42 depresses the pin 46 to release compressed gas from the gas cylinder 40. The compressed gas is then injected into the liquid within the bottle 20 through the carbonating tube 30 to produce a carbonated beverage. As will be readily appreciated, carbonation of the liquid within the bottle 20 is not limited to the manner disclosed herein and may be accomplished by any means known in the art.

Turning now to FIGS. 11, 12 and 14-16, the carbonated beverage appliance 10 also includes a mechanism that allows for the on-demand dispensing of a carbonated beverage from the bottle 20, once carbonated, into a cup or glass (not shown). In particular, as best shown in FIGS. 11 and 12, the on-demand dispensing mechanism includes a connection 58, forming a part of the carbonating head assembly 18, for accommodating a detachable tube 60. In an embodiment, the connection 58 comprises a quick-connect mechanism for releasably retaining the detachable tube 60. For example, as best shown in FIG. 12, the connection 58 may be a ball detent type connection. When connected, the detachable tube 60 extends from the connection 58 of the carbonating head assembly 18 to the bottom of the bottle 20.

As shown in FIGS. 11, 12, 14 and 16, a fluid flow pathway 62 is formed from the connection 58 to an external wall of the housing 12. A dispensing arm 64 having an outlet 66 is pivotally coupled to the appliance 10 and in fluid communication with the fluid flow pathway 62. As best shown in FIG. 16, a valve assembly 68 is positioned within the fluid flow pathway 62 to control the flow of liquid therethrough. In the preferred embodiment, the valve assembly 68 includes a spring-biased plunger 70. The plunger 70 is normally biased by a spring 72 to a closed state to prevent liquid from passing through the valve assembly 68 and into the dispensing arm 64. As best shown in FIG. 16, however, the appliance 10 also includes a depressible button 74 located on the top of the housing 12. The button 74 includes a downwardly depending leg 76 positioned directly above the plunger 70 of the valve assembly 68. When the button 74 is depressed, the depending leg 76 contacts the plunger 74 of the valve assembly 68 and moves the plunger 74 downward against the spring bias. This downward movement of the plunger 74 causes the valve assembly 68 to open, thereby allowing carbonated liquid from the bottle 20 to pass through the valve assembly 68, through the dispensing arm 64, out of the outlet 66 and into a glass.

In an embodiment, the button 74 is also in operative communication with the plunger 42 of the gas cylinder attachment head 36 such that when the button 74 is depressed, pressurized gas flows from the gas cylinder 40 into the bottle 20 to maintain carbonation of the liquid therein and also to generate enough pressure within the bottle 20 to force the carbonated liquid from the bottle, up through the detachable tube 60 and out of the dispensing arm 64.

As discussed above, in an embodiment, the dispensing arm 64 is pivotally attached to the housing 12 so that a user can selectively position the arm 66 to dispense a carbonated beverage from the bottle 20. In other embodiments, the dispensing arm may be internal to the housing 12.

In operation, a user may carbonate the liquid contained in the bottle by activating the lever 44 to dispense pressurized gas from the gas cylinder 40, as discussed above. Once the liquid in the bottle has been carbonated, a user can remove the bottle 20 from the appliance and cap the bottle 20, or alternatively, dispense a single serving into an external cup or glass by depressing the button 74 on the top of the appliance 10. The dispensing of carbonated liquid from the bottle 20 is effectuated by simple displacement utilizing $CO_2$ to push the carbonated liquid up through the detachable tube 60 and out of the nozzle 66 of the dispensing arm 64 when the valve assembly 68 is opened. In particular, depression of the button 74 on the top of the appliance 10 causes the valve 68 to open, and the pressure from the gas cylinder 40 pushes the carbonated liquid up through the tube 60 and out of the dispensing nozzle 66.

As will be readily appreciated, the appliance 10 of the present invention therefore allows for the on-demand dispensing of a carbonated beverage from the bottle 20.

Figure 18:
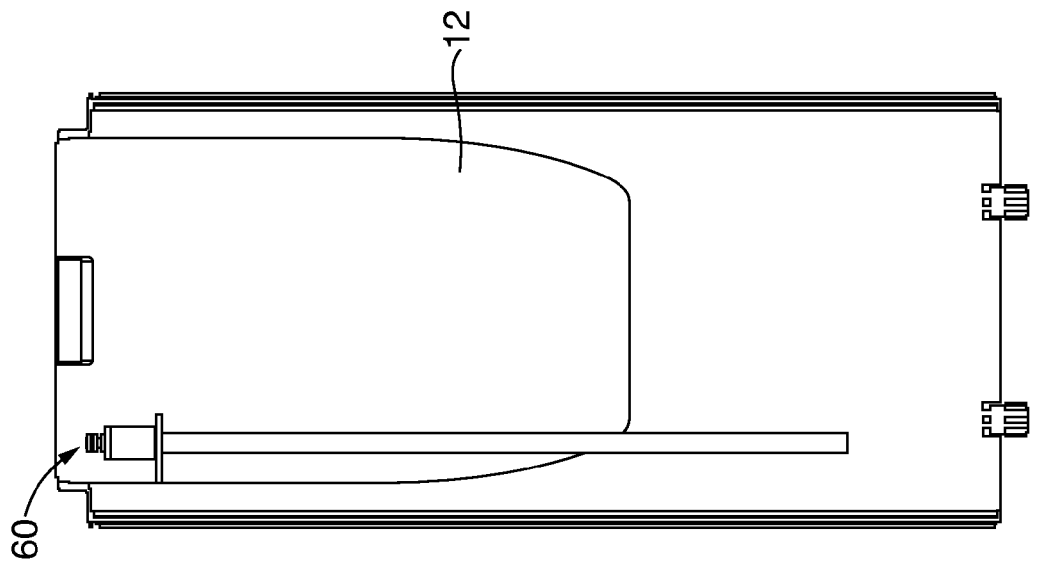
FIGS. 17, 18, and 19 illustrate various dispensing tube storage locations on the carbonated beverage appliance of FIG. 1.
Figure 17:
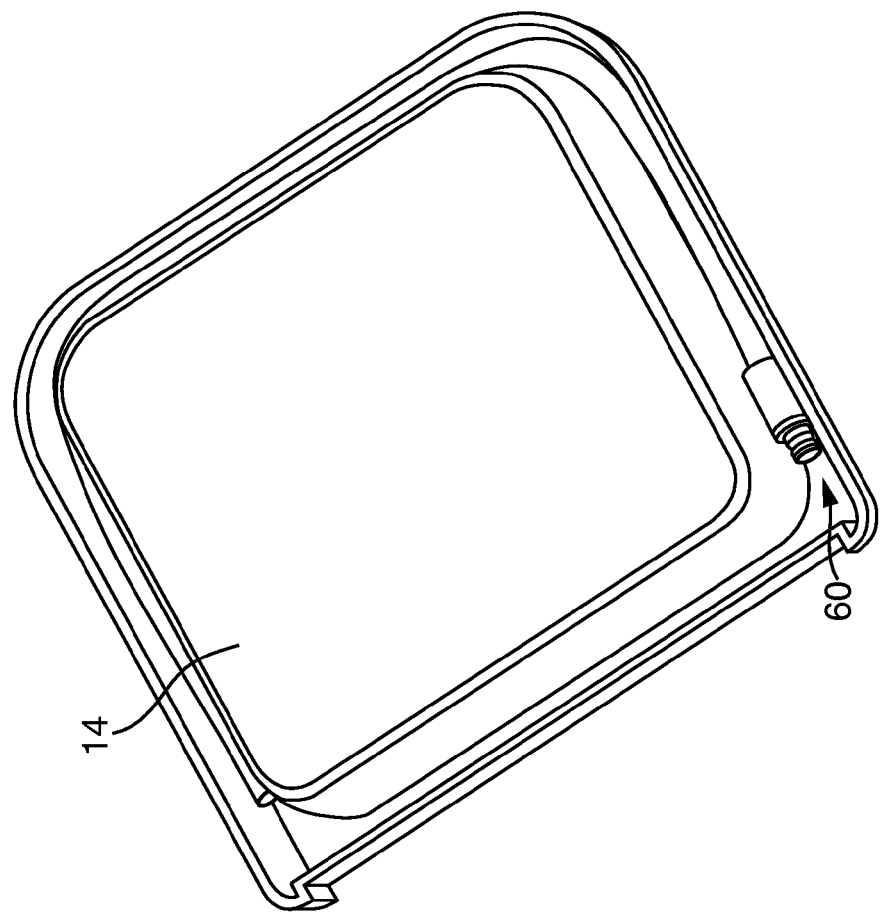
Figure 19:
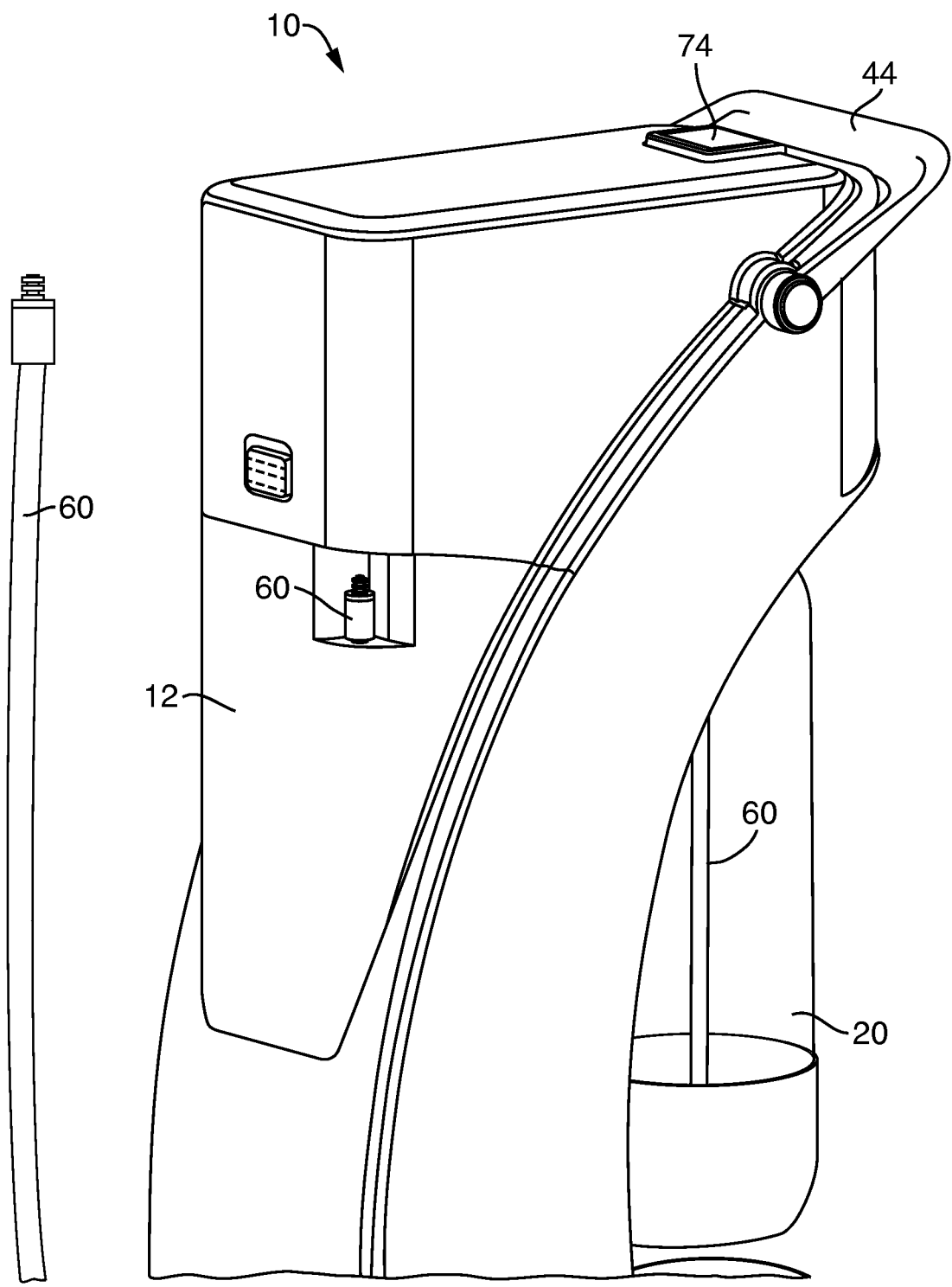

Referring to FIGS. 17-19 the detachable tube 60 may be removed from the connection 58 when not in use and stored within the appliance 10. In particular, as shown in FIG. 17, the detachable tube 60 may be stored underneath the drip tray 14. Alternatively, as shown in FIG. 18, the detachable tube 60 may be stored within the rear of the appliance 10, which is accessible by removing the back cover 38. In another embodiment, the detachable tube 60 may be stored within a recess formed within the housing 12, as shown in FIG. 19.

Importantly, the carbonated beverage appliance 10 of the present invention is compact and is therefore portable and suitable for household, countertop use. As discussed above, the quick connect mechanism for the gas cylinder allows a user to quickly and easily detach and attach a gas cylinder containing pressurized carbon dioxide to the appliance, in contrast to existing devices which require tedious rotation of the gas cylinder to effect threaded engagement of the cylinder. Moreover, as discussed above, the appliance includes an on-demand dispensing mechanism for dispensing a carbonated beverage from the bottle while it is still coupled to the appliance. This is in contrast to existing devices which require the bottle to be removed from the device prior to dispensing a carbonated beverage therefrom. As will be readily appreciated, therefore, the appliance of the present invention affords greater flexibility in terms of carbonated beverage dispensing and storage.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A carbonated beverage appliance, comprising:
   a housing;
   a carbonating head assembly within said housing and configured to releasably receive a bottle containing a liquid to be carbonated, said carbonating head assembly including a carbonating tube having an inlet for receiving pressurized gas from a canister of pressurized gas and an outlet for injecting said pressurized gas into said liquid to be carbonated;
   a gas cylinder head assembly within said housing and being in fluid communication with said carbonating head assembly, said gas cylinder head assembly including a non-threaded engagement means for releasably receiving said canister of pressurized gas;
   a lever for activating the flow of pressurized gas from said canister of pressurized gas to said carbonating head; and
   an on-demand dispensing mechanism configured for selectively dispensing carbonated liquid from said bottle while said bottle is received by said carbonating head assembly.

2. The carbonated beverage appliance of claim 1, wherein:
   said on-demand dispensing mechanism includes a dispensing tube releasably attached to said carbonating head assembly, a dispensing pathway in fluid communication with said dispensing tube, a first valve assembly positioned along said dispensing pathway and controllable between a closed state and an open state, and a dispensing arm in fluid communication with said dispensing pathway.

3. The carbonated beverage appliance of claim 2, further comprising:
   a dispensing button moveable from a first position in which said first valve assembly is in said closed state to a second position in which said button controls said first valve assembly to said open state;
   wherein when in said open state carbonated liquid flows from said bottle attached to said carbonating head assembly, through said dispensing pathway and out of said dispensing arm.

4. The carbonated beverage appliance of claim 1, further comprising:
   a second valve assembly controllable between a closed state, in which pressurized gas is not permitted to flow from said canister of pressurized gas to said carbonating head assembly, and an open state, in which pressurized gas is permitted to flow from said canister to said carbonating head assembly and into said bottle through said outlet of said carbonating tube upon activation of said lever.

5. The carbonated beverage appliance of claim 1, wherein:
said carbonating head assembly includes a threaded engagement means for threadedly receiving said bottle.

6. A carbonated beverage appliance, comprising:
a housing;
a carbonating head assembly within said housing and configured to releasably receive a bottle containing a liquid to be carbonated; and
a gas cylinder head assembly within said housing, said gas cylinder head assembly including a non-threaded engagement means for releasably receiving a canister of pressurized gas;
wherein said canister of pressurized gas has a neck having an annular groove; and
wherein said gas cylinder head assembly includes a flange adapted to engage said annular groove to releasably retain said canister.

7. A carbonated beverage appliance, comprising:
a housing;
a carbonating head assembly within said housing and configured to releasably receive a bottle containing a liquid to be carbonated;
a gas cylinder head assembly within said housing, said gas cylinder head assembly including a non-threaded engagement means for releasably receiving a canister of pressurized gas; and
an on-demand dispensing mechanism configured for selectively dispensing carbonated liquid from said bottle while said bottle is received by said carbonating head assembly.

8. The carbonated beverage appliance of claim 7, wherein:
said gas is carbon dioxide.

9. The carbonated beverage appliance of claim 7, wherein:
said on-demand dispensing mechanism includes a dispensing tube releasably attached to said carbonating head assembly, a dispensing pathway in fluid communication with said dispensing tube, a first valve assembly positioned along said dispensing pathway and controllable between a closed state and an open state, and a dispensing arm in fluid communication with said dispensing pathway.

10. The carbonated beverage appliance of claim 9, wherein:
said carbonating head assembly includes a carbonating tube having an inlet for receiving pressurized gas from said canister of pressurized gas and an outlet for injecting said pressurized gas into said liquid to be carbonated.

11. The carbonated beverage appliance of claim 10, further comprising:
a dispensing button moveable from a first position in which said first valve assembly is in said closed state to a second position in which said button controls said valve assembly to said open state;
wherein when in said open state carbonated liquid flows from said bottle attached to said carbonating head assembly, through said dispensing pathway and out of said dispensing arm.

* * * * *